Patented Nov. 2, 1937

2,097,867

UNITED STATES PATENT OFFICE 2,097,867

PREPARATION OF ANTHRAQUINONE DITHIAZOLES

Alexander J. Wuertz and William L. Rintelman, Carrollville, Wis., assignors to E. I. du Pont de Nemours & Company, Wilmington, Del., a corporation of Delaware No Drawing. Application November 25, 1935, Serial No. 51,472

2 Claims. (Cl. 260—44)

This invention relates to an improvement in the process for preparing anthraquinone-phenyl-thiazoles.

When 2,6-diamino-anthraquinone is fused with sulfur and benzotrichloride in the presence of an inert high-boiling solvent, the yields of anthraquinone-1,2,5,6-bis(C)phenyl-dithiazole are relatively poor and considerable research has been carried out in an attempt to increase the yields as well as the quality of the product. While a large amount of by-products are formed in the reaction, which are believed to result from impurities in the starting material, it was found that starting with a re-purified 2,6-diamino-anthraquinone in many cases the yield was even less than that obtained using a somewhat more impure compound. Impurities in the benzotrichloride resulting from the particular methods used in its preparation also were found to effect the yield of the dithiazole obtained. Again, however, pure benzotrichloride did not give improved yields, although more consistent yields were obtained when re-purified starting materials were used.

We have found that increased and more uniform yields of anthraquinone-1,2,5,6-bis(C)-phenyl-dithiazole are obtained when the fusion of the 2,6-diamino-anthraquinone with sulfur and benzotrichloride is carried out in the presence of iodine. The iodine appears to stabilize the reaction and gives a more uniform product than heretofore obtained, even when the 2,6-diamine used has not been freed from all impurities.

It is an object of this invention to provide an improved process for the preparation of anthraquinone-1,2,5,6-bis(C)phenyl-dithiazole.

It is a further object to provide a process which will give increased and more uniform yields of anthraquinone - 1,2,5,6 - bis(C)phenyl -dithiazole without resort to tedious and expensive purification of the intermediates used, and which will give a product of uniform quality.

According to the present invention, 2,6-diamino-anthraquinone is fused in a high-boiling inert solvent such as naphthalene, diphenyl oxide, or chloro-naphthalene, etc., with benzotrichloride and sulfur, at temperature of from about 212° C. to about 220° C., in the presence of iodine which may be added in the free state or in the form of inorganic or organic salts. The amount of iodine to be used will depend to some extent upon the purity of the diamine and benzotrichloride. Amounts ranging from about .10% to 1% based on the 2,6-diamino-anthraquinone have been found to give satisfactory results. While larger amounts may be added the excess is usually sublimed and escapes from the reaction mass.

To more fully illustrate our invention, the following examples are given in which the parts used are by weight.

Example I 50 parts of technical 2,6-diamino-anthraquinone, 86.6 parts of 100% benzotrichloride (re-distilled), 25 parts of sulfur, .5 part of iodine, and 150 parts of refined naphthalene are slowly (over a three-hour period) heated to 217–20° C. and held at this temperature for 8 hours. The naphthalene is removed by diluting with a suitable high-boiling solvent such as dichlorobenzene and the magma filtered at 180° C. washed with more chlorobenzene and then alcohol. The yield of dyestuff is increased from 10 to 15% over that obtained when the iodine is omitted from the above formula.

Example II 40 parts of 2,6-diamino-anthraquinone (purified by recrystallization from 85% sulfuric acid), 10 parts of impurities (removed by above purification), 86.6 parts benzotrichloride (re-distilled), 25 parts sulfur, .5 part iodine, and 150 parts naphthalene are slowly heated over a three-hour period to 217–20° C. and held at this temperature for 8 hours. The mass is further treated as in Example I. An increase in yield of anthraquinone-1,2,5,6-bis(C) phenyl-dithiazole of from 10 to 15% over that resulting from the same process when the iodine is omitted is obtained.

The iodine used may be in the form of free iodine or its organic or inorganic salts, such as sodium or potassium iodide, copper iodide, para-iodotoluene, or other iodo organic compounds which readily liberate iodine and which do not enter into the reaction.

It is, of course, understood that the above conditions may be varied considerably without altering the spirit of this invention, for instance the fusion may be carried out at lower temperatures over a longer period of time. The products may be isolated by steam distillation and re-extracted with high-boiling solvents. The excess of reaction components may also be varied considerably without changing the results.

We claim:

1. In the process for preparing anthraquinone-1,2,5,6-bis(C)phenyl-dithiazole which comprises fusing 2,6-diamino-anthraquinone with benzotrichloride and sulfur in the presence of a high-boiling solvent, the step which comprises carrying out the reaction in the presence of iodine.

2. The process which comprises fusing 2,6-diamino-anthraquinone with benzotrichloride and sulfur in naphthalene and in the presence of a small quantity of iodine, at temperatures of from 212° to 220° C.

ALEXANDER J. WUERTZ.
WILLIAM L. RINTELMAN.